United States Patent
Hondo (10) Patent No.: US 7,398,108 B2
(45) Date of Patent: Jul. 8, 2008

(54) MOBILE COMMUNICATION SYSTEM, RADIO BASE STATION APPARATUS, OPERATION CONTROL METHOD THEREFOR AND PROGRAM

(75) Inventor: Shinya Hondo, Tokyo (JP)

(73) Assignee: NEC Corporation, Tokyo (JP)

( * ) Notice: Subject to any disclaimer, the term of this patent is extended or adjusted under 35 U.S.C. 154(b) by 607 days.

(21) Appl. No.: 10/802,834

(22) Filed: Mar. 18, 2004

(65) Prior Publication Data

US 2004/0184421 A1    Sep. 23, 2004

(30) Foreign Application Priority Data

Mar. 19, 2003  (JP)  ............................. 2003-074692

(51) Int. Cl.
*H04B 1/38* (2006.01)
*H04M 1/00* (2006.01)

(52) U.S. Cl. .................................................... 455/561
(58) Field of Classification Search ................. 370/328; 455/561

See application file for complete search history.

(56) References Cited

OTHER PUBLICATIONS

"3rd Generation Partnership Project; Technical Specification Group Radio Access Network; Physical layer procedures (FDD)", 3GPP TS 25.214 V3.9.0, Dec. 2001, pp. 28-30.

*Primary Examiner*—William D. Cumming
(74) *Attorney, Agent, or Firm*—McGinn IP Law Group PLLC (57) ABSTRACT

There is provided a radio base station apparatus capable of self-recovery from an AICH abnormal state or notification to maintenance personnel. An RACH preamble detection circuit detects an RACH preamble from an inputted delay profile, and outputs detection information (detection position and reception power) on the detected RACH preamble, to an AICH abnormality determination section. The AICH abnormality determination section determines whether an AICH abnormal state has been caused in which a mobile station retransmits an RACH preamble in spite of a base station having already detected the RACH preamble, based on the detection information. If the AICH abnormal state has been caused, then an AICH/alarm control section controls the transmit power for the AICH or outputs an alarm signal.

18 Claims, 8 Drawing Sheets

PRIOR ART

FIG. 8

PRIOR ART

MOBILE COMMUNICATION SYSTEM, RADIO BASE STATION APPARATUS, OPERATION CONTROL METHOD THEREFOR AND PROGRAM

BACKGROUND OF THE INVENTION

1. Field of the Invention

The present invention relates to a mobile communication system, a radio base station apparatus, an operation control method therefor, and a program, and particularly to an improvement of a mobile communication system that a mobile station transmits an RACH (random access channel) preamble to a base station prior to transmitting an RACH message to the base station, and in response to detection of the RACH preamble, the base station transmits an AICH (acquisition indicator channel) to the mobile station.

2. Description of the Related Art

Recently, the interference-resistant spread spectrum communication method has attracted a lot of attention as one of communication methods applicable to mobile communication systems. In a radio communication system using the spread spectrum communication method, after digitized voce data or image data is modulated with a digital modulation method such as the PSK and FSK modulation methods in a transmitting-side apparatus, for example, the modulated data is converted into a broadband baseband signal using a spread code such as a pseudorandom noise code (PN code), then converted into radio frequency signal, and transmitted.

Meanwhile, in a receiving-side apparatus, the received radio frequency signal is de-spread with the same code as the spread code used by the transmitting-side apparatus, and after that, it is digital-demodulated with the PSK or FSK demodulation method to reproduce the received data.

In a random access control method in a conventional CDMA mobile communication system, wherein each of multiple mobile stations accesses to a base station using an RACH (random access channel) at an arbitrary timing as required and the base station controls its message sending in response to the access, when a mobile station makes a call, it transmits an RACH preamble notifying that an RACH message has occurred, to the base station prior to transmitting the RACH message. In this case, the mobile station selects one signature from among sixteen kinds of signatures at random and generates the preamble from the selected signature.

On receiving the preamble, the base station compares a predetermined threshold with the correlation value. If the correlation value is larger, then it is determined that the preamble has been detected, and an AICH (acquisition indicator channel) corresponding to the signature of the detected preamble is transmitted to the mobile station. The base station searches for all the sixteen kinds of signatures, and the AICH is not transmitted if no preamble is detected. The AICH includes the signature number of the detected preamble, and information "ACK (acknowledge)" indicating that message sending by the mobile station is permitted by the base station or information "NACK (negative acknowledge)" indicating that message sending is not permitted.

If the mobile station receives an AICH corresponding to the signature of the preamble within a predetermined period of time after transmitting the preamble, it transmits a message in the case of "ACK", and exits the random access procedure in the case of "NACK". If the mobile station cannot receive an AICH corresponding to the signature number of the preamble in the predetermined period of time, it increases transmit power by the step width of power ramping (Power Ramp Step) and transmits the preamble again. Generally, mobile stations retransmit a preamble at predetermined intervals, and the step width of power ramping is constant.

Figure 7:
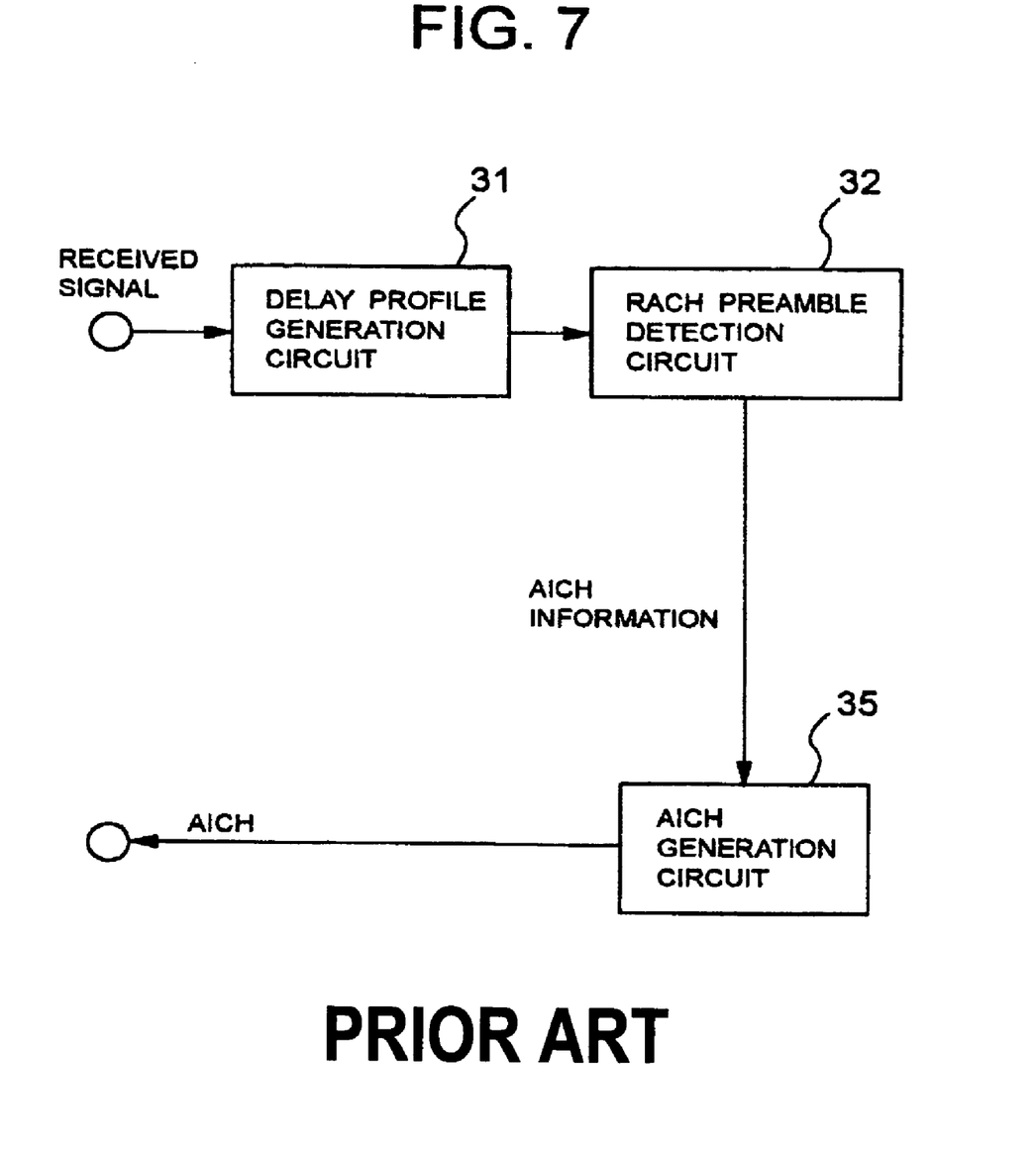
FIG. 7 shows the configuration of a conventional radio base station apparatus.
Figure 8:
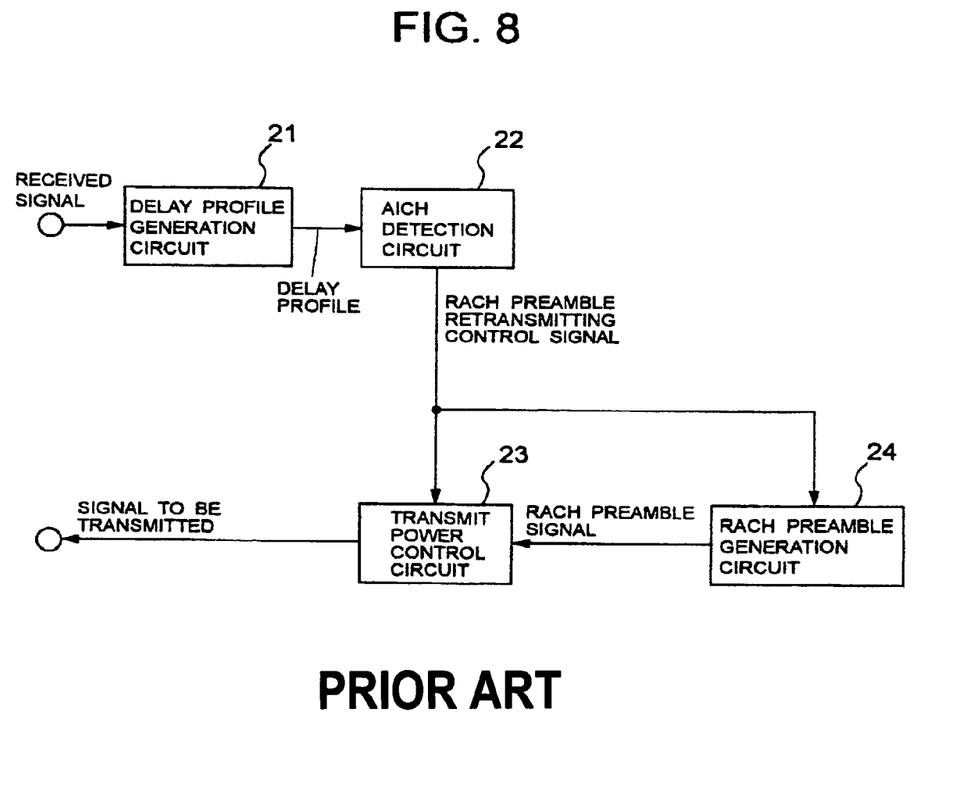
FIG. 8 shows the configuration of a conventional mobile station.

Detail description will be now made on the random access control method described above, referring to drawings. FIG. 7 shows the configuration of a conventional radio base station apparatus, and FIG. 8 shows the configuration of a conventional mobile station (radio terminal apparatus). Referring to FIG. 7, the conventional radio base station apparatus comprises a delay profile generation circuit 31, an RACH preamble detection circuit 32 and an AICH generation circuit 35.

The delay profile generation circuit 31 performs correlation calculation between the received signal from the mobile station shown in FIG. 8 inputted into the delay profile generation circuit 31 and each of known RACH preamble codes corresponds to signatures, and generates delay profiles based on the correlation calculation results. In this case, the delay profile generation circuit 31 is activated in a constant cycle of arrival of an RACH preamble.

Each of the delay profiles created by the delay profile generation circuit 31 is outputted to the RACH preamble detection circuit 32. If a correlation peak equal to or above a predetermined threshold is detected from the delay profile, the RACH preamble detection circuit 32 determines that an RACH preamble has been detected. The RACH preamble detection circuit 32 then provides "ACK" indicating permission for the use of resources or "NACK" indicating refusal of the use of resources for each of the signatures of the detected RACH preambles and outputs them to the AICH generation circuit 35 as AICH information. The AICH generation circuit 35 generates and transmits an AICH based on the AICH information.

As shown in FIG. 8, the conventional mobile station comprises a delay profile generation circuit 21, an AICH detection circuit 22, a transmit power control circuit 23 and an RACH preamble generation circuit 24.

The delay profile generation circuit 21 performs correlation calculation using the same spread code as the spread code used by the radio base station apparatus shown in FIG. 7 for the received signal from the radio base station apparatus inputted into the delay profile generation circuit 21, and generates a delay profile based on the correlation calculation result. The delay profile is outputted to the AICH detection circuit 22, and it is determined whether an RACH preamble which the mobile station sent has been detected by the radio base station apparatus and whether resources have been assigned.

In this case, if the AICH detection circuit 22 cannot receive an AICH corresponding to the signature of an RACH preamble within a predetermined period of time after transmitting the RACH preamble, it determines that the radio base station apparatus could not detect the RACH preamble, and therefore outputs an RACH preamble retransmitting control signal to the transmit power control circuit 23 and the RACH preamble generation circuit 24.

On receiving the RACH preamble retransmitting control signal, the RACH preamble generation circuit 24 outputs an RACH preamble signal to the transmit power control circuit 23 after an interval of a predetermined number of access slots, and the transmit power control circuit 23 transmits the RACH preamble signal with power increased by a predetermined value relative to the power used when previously transmitting the RACH preamble signal.

The random access control method described above is disclosed in 3 GPP TS 25.214 V3.9.0, December 2001, pp. 28 to 30, for example.

In such a random access control method, there may be a case as shown below. That is, for a mobile station located near the border of a cell of the radio base station apparatus, for example, it is difficult to receive an AICH. When the mobile station cannot receive an AICH, there is caused an AICH abnormal state (the state in which a mobile station keeps ramping in spite of having sent an RACH preamble with power exceeding a detection threshold set for the radio base station apparatus, while the radio base station apparatus has normally detected the RACH preamble and therefore performs the operation of detecting an RACH message; and as a result, an RACH message cannot be sent), while a mobile station located in the center of the cell, which is in good receiving conditions, can detect an AICH.

In such a case, if there are more mobile stations in the center of the cell than near the border, the phenomenon that the radio base station apparatus cannot receive an RACH message does not appear obviously, and therefore it is difficult for maintenance personnel to find it. The same goes for the case where the phenomenon is caused by a mistake in setting of a transmit power value for an AICH or a failure in the radio base station apparatus. To the user who cannot send an RACH message, however, such condition seems to be a state in which he cannot start communication or a call for a long time (no service state). which will significantly damage his reliability on the communication service.

As described above, there is a problem that even if a mobile station cannot detect an AICH because of bad AICH receiving conditions, recovery from the AICH abnormal state cannot be performed until RACH messages cannot be sent so frequently that maintenance personnel notice the AICH abnormal state and change the setting for the AICH transmit power.

SUMMARY OF THE INVENTION

The object of the present invention is to provide a mobile communication system, a radio base station apparatus, an operation control method therefor and a program, capable of self-recovery from an AICH abnormal state or notification of an AICH abnormal state to maintenance personnel.

A mobile communication system according to the present invention is a mobile communication system wherein a mobile station repeatedly transmits a predetermined preamble to a base station prior to transmitting a message to the base station until the mobile station receives an indication signal indicating that transmitting of the message is permitted or refused, and the base station, when detecting the preamble from the mobile station, transmits the indication signal to the mobile station; the mobile communication system comprising determination means for determining whether receiving of the indication signal by the mobile station is enabled or disabled based on detection information on the preamble detected by the base station.

In the mobile communication system, the determination means outputs an abnormality signal if determining that receiving of the indication signal by the mobile station is disabled, the mobile communication system further comprising control means for causing transmit power for the indication signal to be increased in response to receiving the abnormality signal.

In the mobile communication system, the determination means outputs the abnormality signal if the number of mobile stations for which receiving of the indication signal is determined to be disabled is equal to or above a predetermined threshold, or if the total of this number and the number of mobile stations for which receiving of the indication signal has been determined to be disabled previously is equal to or above the predetermined threshold.

An operation control method according to the present invention is an operation control method for a mobile communication system wherein a mobile station repeatedly transmits a predetermined preamble to a base station prior to transmitting a message to the base station until the mobile station receives an indication signal indicating that transmitting of the message is permitted or refused, and the base station, when detecting the preamble from the mobile station, transmits the indication signal to the mobile station; the operation control method comprising a determination step of determining whether receiving of the indication signal by the mobile station is enabled or disabled based on detection information on the preamble detected by the base station.

A radio base station apparatus according to the present invention is a radio base station apparatus in a mobile communication system wherein a mobile station repeatedly transmits a predetermined preamble to a radio base station apparatus prior to transmitting a message to the radio base station apparatus until the mobile station receives an indication signal indicating that transmitting of the message is permitted or refused, and the radio base station apparatus transmits the indication signal to the mobile station when the radio base station apparatus detects the preamble from the mobile station; the radio base station apparatus comprising determination means for determining whether receiving of the indication signal by the mobile station is enabled or disabled based on detection information on the detected preamble.

In the radio base station apparatus, the determination means outputs an abnormality signal if determining that receiving of the indication signal is disabled, the radio base station apparatus further comprising control means for causing transmit power for the indication signal to be increased in response to receiving the abnormality signal.

In the radio base station apparatus, the determination means outputs the abnormality signal if the number of mobile stations for which receiving of the indication signal is determined to be disabled is equal to or above a predetermined threshold, or if the total of this number and the number of mobile stations for which receiving of the indication signal has been determined to be disabled previously is equal to or above the predetermined threshold.

Another operation control method according to the present invention is an operation control method for a radio base station apparatus in a mobile communication system wherein a mobile station repeatedly transmits a predetermined preamble to a radio base station apparatus prior to transmitting a message to the radio base station apparatus until the mobile station receives an indication signal indicating that transmitting of the message is permitted or refused, and the radio base station apparatus transmits the indication signal to the mobile station when the radio base station apparatus detects the preamble from the mobile station; the operation control method comprising a determination step of determining whether receiving of the indication signal by the mobile station is enabled or disabled based on detection information on the detected preamble.

A program according to the present invention is a program for causing a computer to perform an operation control method for a radio base station apparatus in a mobile communication system wherein a mobile station repeatedly transmits a predetermined preamble to a radio base station apparatus prior to transmitting a message to the radio base station apparatus until the mobile station receives an indication signal indicating that transmitting of the message is permitted or refused, and the radio base station apparatus transmits the indication signal to the mobile station when the radio base station apparatus detects the preamble from the mobile station;

the program comprising a determination step of determining whether receiving of the indication signal by the mobile station is enabled or disabled based on detection information on the detected preamble.

According to the present invention, a mobile communication system, wherein a mobile station transmits an RACH preamble to a base station prior to transmitting an RACH (random access channel) message, and the base station transmits an AICH (acquisition indicator channel) to the mobile station when it detects the preamble from the mobile station, is configured to determine whether receiving of the AICH by the mobile station is enabled or disabled based on detection information on the RACH preamble detected by the base station.

The mobile station does not retransmit the RACH preamble when it can receive the AICH, but it retransmits the RACH preamble if it cannot receive the AICH. Therefore, it is possible to determine whether or not an AICH abnormal state has been caused, in which the mobile station retransmits the RACH preamble in spite of the base stating having detected the RACH preamble, using detection information on the RACH preamble (at least one of the detection position and the reception power for the RACH preamble), that is, whether or not the mobile station can receive the AICH.

In this way, the determination means is adapted to determine whether or not a mobile station can receive an AICH with the use of detection information on an RACH preamble, thereby enabling self-recovery from an AICH abnormal state or notification of the abnormal state to maintenance personnel.

DETAILED DESCRIPTION OF THE PREFERRED EMBODIMENTS

Embodiments of the present invention will be now described, referring to drawings.

Figure 1:
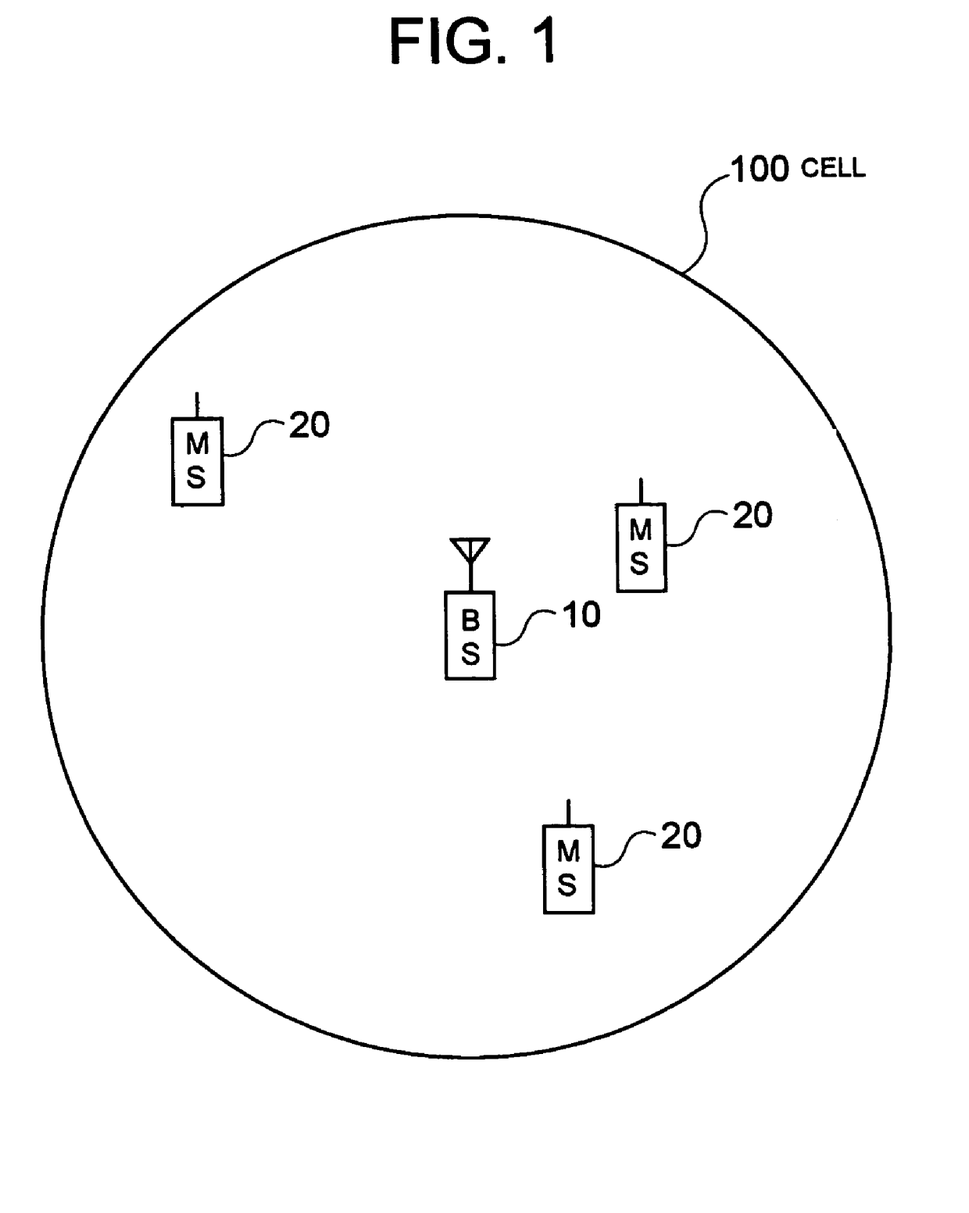
FIG. 1 shows the configuration of a mobile communication system according to a first embodiment of the present invention.

FIG. 1 shows the configuration of a mobile communication system according to a first embodiment of the present invention. As shown in FIG. 1, the mobile communication system according to the first embodiment of the present invention comprises a radio base station apparatus (BS) 10 and mobile stations (MS) 20 existing within a cell 100 of the radio base station apparatus 10. The radio base station apparatus 10 is connected to a CN (core network) not shown via a radio network controller not shown.

The mobile station 20 accesses to the radio base station apparatus 10 using an RACH (random access channel) at an arbitrary timing as required. That is, the mobile station 20 selects one of available access slots at random prior to transmitting an RACH message, and transmits an RACH preamble to the radio base station apparatus 10 via the selected access slot, which notifies that an RACH message has occurred. Two frames correspond to fifteen accesss lots (accesss lots #0 to #14). The mobile station 20 selects one signature at random from sixteen kinds of signatures, and generates the preamble with the selected signature.

When detecting the RACH preamble, the radio base station apparatus 10 transmits an AICH (acquisition indicator channel) corresponding to the: signature number of the detected RACH preamble, to the mobile station 20.

If, after transmitting an RACH preamble, the mobile station 20 receives an AICH corresponding to the signature number of the RACH preamble within a predetermined period of time and it is "ACK", then the mobile station 20 transmits an RACH message. If the AICH is "NACK", then the mobile station 20 exits the random access procedure.

On the contrary, if, after transmitting an RACH preamble, the mobile station 20 cannot receive an AICH corresponding to the signature number of the RACH preamble within a predetermined period of time, then the mobile station 20 retransmits the RACH preamble after a predetermined RACH preamble retransmitting interval (typically, an interval corresponding to several access slots). In this case, the mobile station 20 increases transmit power by a predetermined value (the step width of power ramping) with power ramping to transmit the RACH preamble again.

Figure 2:
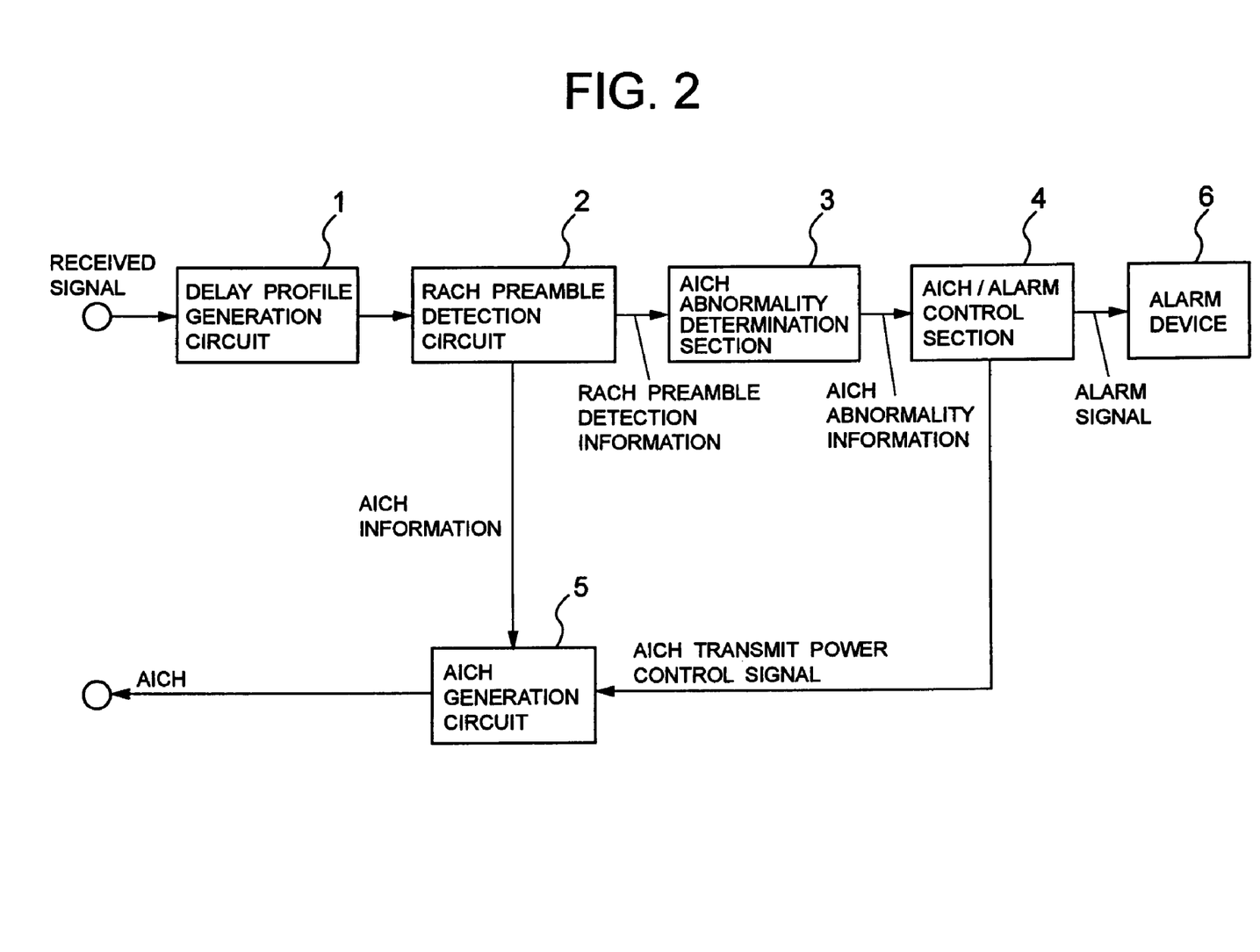
FIG. 2 shows the configuration of a radio base station apparatus shown in FIG. 1.

FIG. 2 shows the configuration of the radio base station apparatus 10 in FIG. 1. As shown in FIG. 2, the radio base station apparatus 10 comprises a delay profile generation circuit 1, an RACH preamble detection circuit 2, an AICH abnormality determination section 3, an AICH/alarm control section 4, an AICH generation circuit 5 and an alarm device 6. The configuration of the mobile station 20 is the same as that of the mobile station shown in FIG. 8, and therefore description thereof is omitted.

In FIG. 2, the delay profile generation circuit 1 performs correlation calculation between the received signal from the mobile station 20 and each of the known RACH preamble codes corresponding to the signatures, and generates delay profiles based on the correlation calculation results. In this case, the delay profile generation circuit 1 is activated in a constant cycle in which an RACH preamble arrives. That is, the delay profile generation circuit 1 generates delay profiles for each access slot. Each of the delay profiles created by the delay profile generation circuit 1 is outputted to the RACH preamble detection circuit 2.

If a correlation peak equal to or above a predetermined threshold is detected from a delay profile, the RACH preamble detection circuit 2 determines that an RACH preamble has been detected and outputs detection information on the detected RACH preamble to the AICH abnormality determination section 3. In this case, the contents of the detection information on the RACH preamble includes the access slot number at which the RACH preamble is received, the signature number of the RACH preamble, the detection position (receiving timing) and a correlation power value. If a plurality of RACH preambles are detected by the RACH preamble detection circuit 2, the detection information outputted from the RACH preamble detection circuit 2 includes the access slot number, the signature number, the detection position and a correlation power value for each of the RACH preambles.

The RACH preamble detection circuit 2 provides "ACK" indicating permission for the use of resources or "NACK" indicating refusal of the use of resources for each of the signatures of the detected RACH preambles and outputs it to the AICH generation circuit 5 as AICH information.

The AICH abnormality determination section 3 determines whether or not the mobile station 20 is in an abnormal state in which the mobile station 20 repeats sending of an RACH preamble using power ramping even though the radio base station apparatus 10 has already detected the RACH preamble from the mobile station 20 and has sent an AICH to the mobile station 20, based on the detection information from the circuit 2. If the mobile station 20 is in the abnormal state, the AICH abnormality determination section 3 also determines whether the abnormal state has been caused by the radio base station apparatus or by the mobile stations. If it has been caused by the radio base station apparatus the AICH abnormality determination section 3 outputs an AICH abnormality information to the AICH/alarm control section 4.

The AICH abnormality determination section 3 has a storage section not shown which stores the detection information from the RACH preamble detection circuit 2. This storage section has storage areas which correspond to the past several frames. That is, the storage section stores detection information on all RACH preambles received at the past several frames. For example, in the case where the storage section has storage areas which correspond to two frames, the detection position and the correlation power value for each of all the RACH preambles received at the past fifteen access slots are stored in the storage area corresponding to the access slot number at which the RACH preamble was received.

When an AICH abnormality information is inputted, the AICH/alarm control section 4 outputs an AICH transmit power control signal to the AICH generation circuit 5 or outputs an alarm signal to the alarm device 6. The AICH generation circuit 5 generates and transmits an AICH using AICH information and the AICH transmit power control signal. Though the AICH generation circuit 5 usually transmits an AICH with a preset transmit power value, it increases the transmit power for the AICH by a predetermined value and transmits the AICH if it receives the AICH transmit power control signal.

Description will be made below on the operation of the radio base station apparatus 10 according to the first embodiment of the present invention, particularly to the operations of the AICH abnormality determination section 3 and the AICH/alarm control section 4, referring to drawings.

Figure 3:
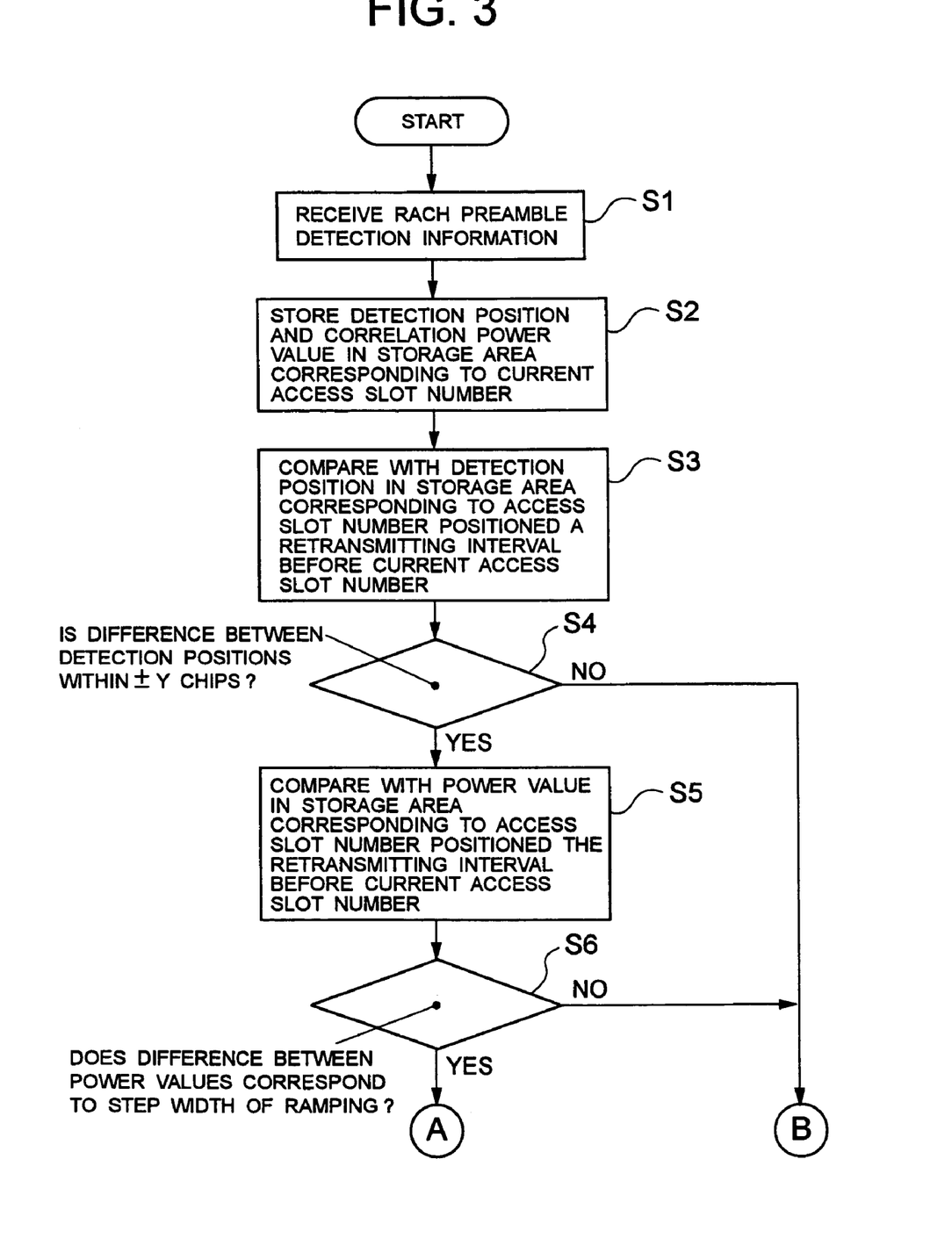
FIG. 3 is a flowchart showing the operation of an AICH abnormality determination section shown in FIG. 2.
Figure 4:
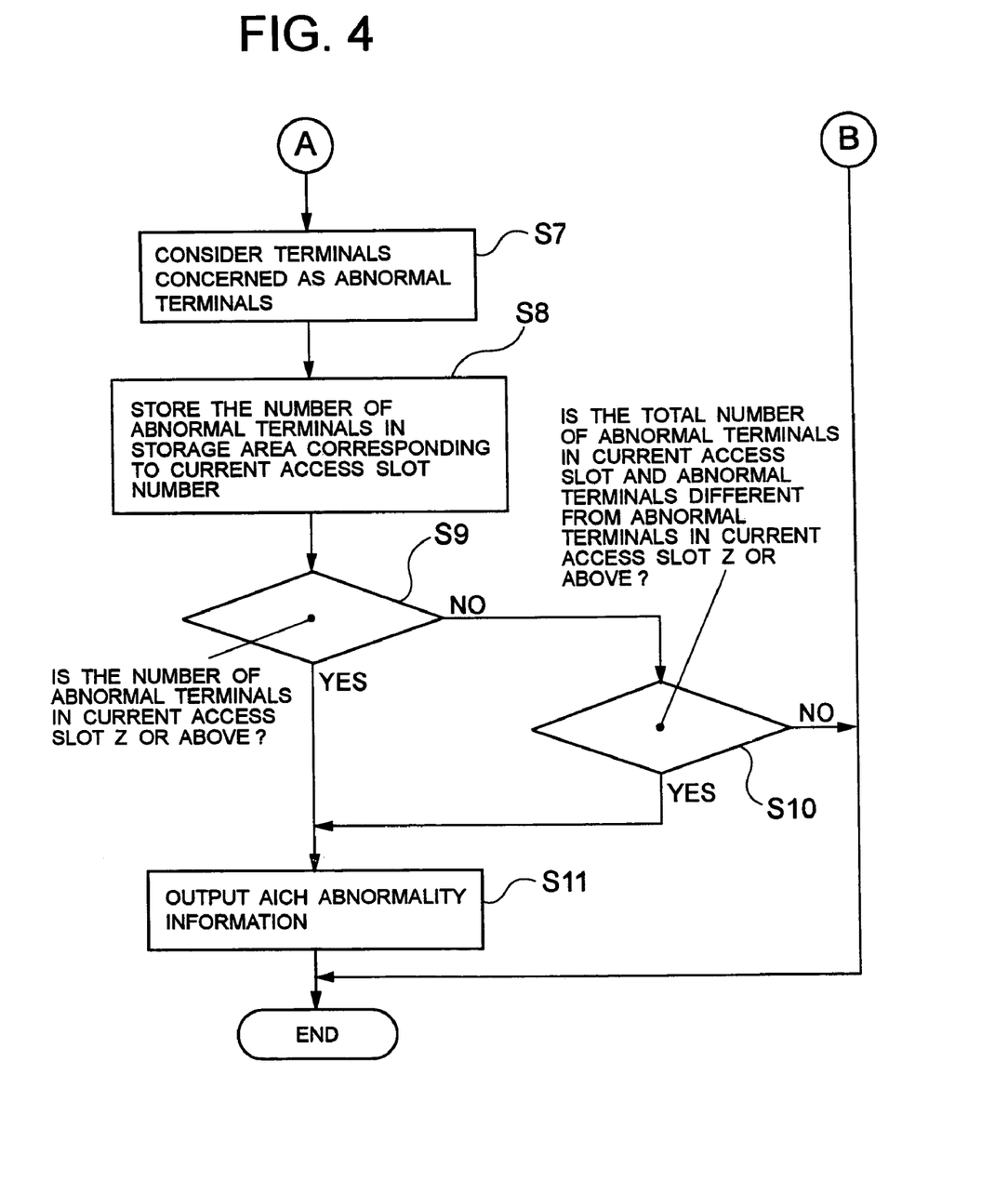
FIG. 4 is a flowchart showing the operation of the AICH abnormality determination section shown in FIG. 2.

FIGS. 3 and 4 are flowcharts showing the operation of the AICH abnormality determination section 3 in FIG. 2. In FIGS. 3 and 4, on receiving detection information on an RACH preamble detected by the RACH preamble detection circuit 2, the AICH abnormality determination section 3 starts operation (step S1) and stores, in a storage area corresponding to the access slot number at which the RACH preamble (hereinafter referred to as "the RACH preamble currently detected") is received, the detection position and the correlation power value for the RACH preamble currently detected (step S2).

The AICH abnormality determination section 3 then compares the detection position of the RACH preamble currently detected, with the detection position stored in the storage area corresponding to the access slot number positioned a predetermined retransmitting interval (generally several access slots) before the access slot number at which the RACH preamble currently detected is received (step S3). That is, the AICH abnormality determination section 3 compares the detection position of the RACH preamble currently detected with the detection position of an RACH preamble detected a predetermined retransmitting interval before detection of the RACH preamble currently detected.

If the difference between the detection positions is within ±Y chips (step S4: YES), then the AICH abnormality determination section 3 compares the correlation power value for the RACH preamble currently detected with the correlation power value for the RACH preamble detected a predetermined retransmitting interval before detection of the RACH preamble currently detected (step S5).

If the difference between the correlation power values is equal to the step width of the power ramping (step S6: YES), it means that the RACH preamble currently detected and the RACH preamble detected a predetermined retransmitting interval before detection of the RACH preamble currently detected have been sent from the same mobile station. Therefore, the AICH abnormality determination section 3 considers the mobile station to be an abnormal terminal which repeats sending of an RACH preamble even though the radio base station apparatus 10 has already sent an AICH (step S7).

Even when a mobile station is moving fast, if an RACH preamble is retransmitted at a common retransmitting interval (several access slots), the detection position of the RACH preamble does not change. Therefore, if the detection position of the RACH preamble currently detected almost corresponds to the detection position of an RACH preamble detected a predetermined retransmitting interval before detection of the RACH preamble currently detected (step 4: YES), then there is a high possibility that the RACH preambles have been sent from the same terminal and the terminal is performing power ramping. Furthermore, if the difference between the correlation power values corresponds to the step width of the power ramping (step S6: YES), then the possibility that the same terminal is performing the power ramping is much higher. Accordingly, a mobile station which meets these conditions can be said to be an abnormal terminal which performs power ramping in spite of having already sent an RACH preamble with power exceeding a detection threshold.

In the case of a plurality of RACH preambles currently detected, that is, detection positions and correlation power values for a plurality of RACH preambles are included in the detection information inputted in the AICH abnormality determination section 3, then the AICH abnormality determination section 3 compares the detection position and the correlation power value for each of the plurality of RACH preambles with the detection position and the correlation power value for the RACH preamble detected a predetermined retransmitting interval before detection of the RACH preamble currently detected, at steps S3 and S5.

The AICH abnormality determination section 3 then stores the number of abnormal terminals, which is the number of mobile terminals considered to be abnormal terminals, in a storage area corresponding to the access slot number at which the RACH preambles currently detected are received (step 58).

If the number of mobile terminals considered to be abnormal terminals is Z or above in the current access slot (the access slot at which the RACH preambles currently detected are received) (step S9: YES), then the possibility is low that the mobile stations considered to be abnormal terminals cannot receive an AICH and repeat sending of an RACH preamble because of their failures. Therefore, the AICH abnormality determination section 3 outputs AICH abnormality information to the AICH/alarm control section 4 (step S11).

In the case where the storage section has storage areas which correspond to the past two frames, the current access slot is the access slot #14, and the predetermined retransmitting interval (retransmitting cycle) is five access slots, it is conceivable that the total number of the abnormal terminals stored in the storage areas which correspond to the past two frames, except for the number of the abnormal terminals stored in the storage areas corresponding to the access slots #14, #9 and #4, respectively, is the number of abnormal terminals different from the abnormal terminals in the current access slot.

Accordingly, even when the number of abnormal terminals in the current access slot is below Z (step S9: NO), if the total of the number of the abnormal terminals in the current access slot and the number of the abnormal terminals different therefrom is Z or above (step S10, YES), then the possibility is low that the abnormal state has been caused by mobile station failures. Therefore, the AICH abnormality determination section 3 outputs AICH abnormality information to the AICH/alarm control section 4 (step S11). However, if the total number of abnormal terminals is below Z (step S10: NO), the possibility is high that the abnormal state has been caused by mobile station failures. Therefore, the AICH abnormality determination section 3 does not output the AICH abnormality information.

Figure 5:
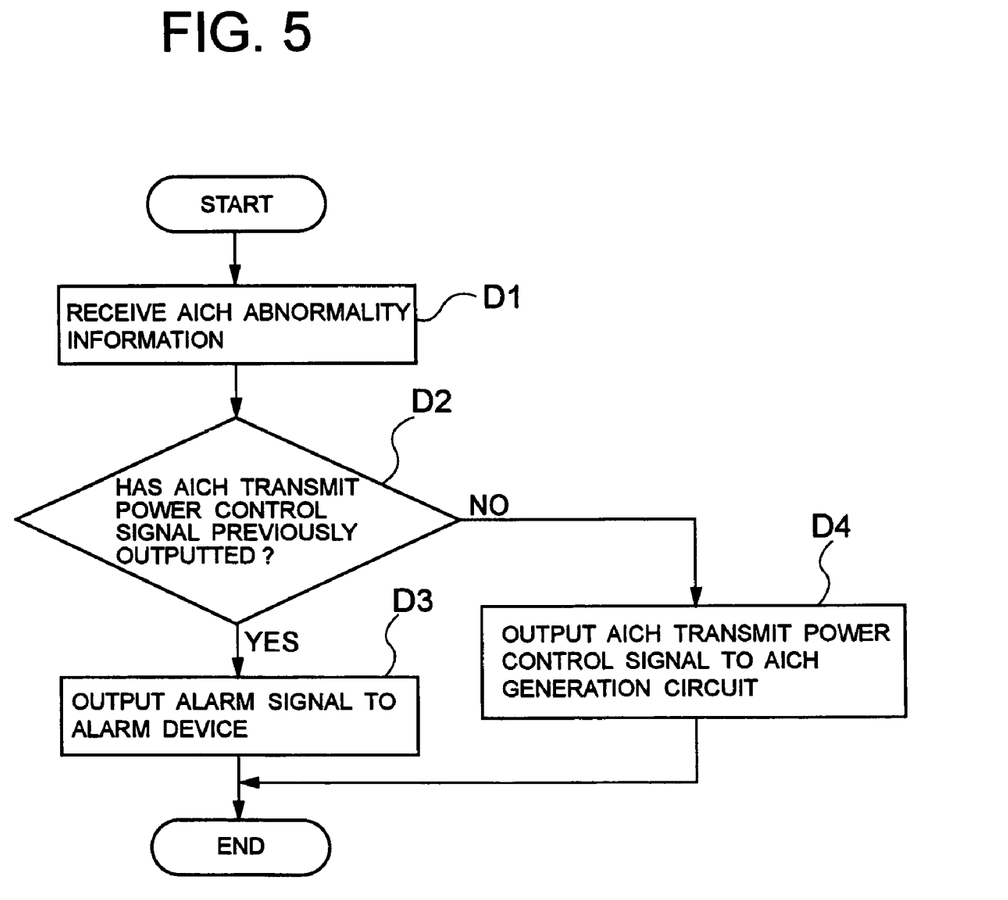
FIG. 5 is a flowchart showing the operation of an AICH/alarm control section shown in FIG. 2.

FIG. 5 shows the operation of the AICH/alarm control section 4 in FIG. 2. In FIG. 5, when the AICH abnormality information from the AICH abnormality determination section 3 is inputted, the AICH/alarm control section 4 starts operation (step D1) and checks whether an AICH transmit power control signal has already been outputted to the AICH generation circuit 5 (step D2). If the AICH abnormality information has been inputted for the first time (step D2: NO), then the AICH/alarm control section 4 outputs the AICH transmit power control signal to the AICH generation circuit 5 to increase transmit power for the AICH, and thereby attempts recovery from the AICH abnormal state (step D4).

If the AICH abnormality information has already been inputted once, and an AICH transmit power control signal has been already outputted to the AICH generation circuit 5 (step D2: YES), the AICH abnormal state cannot be solved even by increasing the transmit power for the AICH, and the possibility is high that the AICH abnormal state has been caused by a significant mistake in setting of the transmit power value preset for the AICH or a failure in the radio base station apparatus 10. Therefore, the AICH/alarm control section 4 outputs an alarm signal to the alarm device 6 (step D3). On receiving the alarm signal, the alarm device 6 signals the maintenance personnel to the effect that the AICH abnormal state cannot be solved even by increasing the transmit power for the AICH.

In some cases, a mobile station may not be able to receive an AICH with the transmit power value preset for the AICH because of changes in the propagation environment. In such cases, the mobile station determines that the RACH preamble it sent has not been received by a radio base station apparatus, and therefore repeats sending of the RACH preamble by gradually increasing the transmit power for the RACH preamble with power ramping. Meanwhile, the radio base station apparatus, having normally received the RACH preamble and transmitted an AICH, expects the mobile station to transmit an RACH message and performs an operation for receiving the RACH message.

Thus, the mobile station wastes power by performing power ramping and transmits an RACH preamble with a power value increased higher than required, which will affect the propagation environment. Furthermore, the radio base station apparatus wastefully consumes resources required for the operation of receiving the RACH message.

However, according to the first embodiment of the present invention, the radio base station apparatus 10 detects the AICH abnormal state in which the mobile station 20 repeats sending of an RACH preamble in spite of the radio base station apparatus 10 having already detected the RACH preamble sent by the mobile station 20 and Increases the transmit power for the AICH to improve the AICH receiving conditions in the mobile station 20. Thereby, it is possible to prevent the unnecessary power ramping by the mobile station 20 and the wasteful RACH message receiving operation by the radio base station apparatus 10.

Furthermore, according to the first embodiment of the present invention, the radio base station apparatus 10 notifies the AICH abnormal state to maintenance personnel using the alarm device 6. Thereby, the maintenance personnel can promptly recognize the AICH abnormal state and cope with the mistake in the setting of the transmit power value for the AICH or the failure in the apparatus.

In FIG. 3, the processing at steps S5 and S6 may be omitted, or the processing at steps S3 and S4 may be omitted. In FIG. 4, the processing at steps S7 to S10 may be omitted. That is, when determining that an AICH abnormal state is caused, the AICH abnormality determination section 3 may output the AICH abnormality information without determining whether the AICH abnormal state is caused by the radio base station apparatus or by the mobile stations.

At step S10 in FIG. 4, the AICH abnormality determination section 3 compares the total of the number of abnormal terminals in the current access slot and the number of abnormal terminals different therefrom with Z. However, the number of all the abnormal terminals detected during the past several frames may be compared with Z. That is, in the case where the storage section of the AICH abnormality determination section 3 has storage areas which correspond to the past two frames, and the current access slot is the access slot #14, the AICH abnormality determination section 3 may compare the number of abnormal terminals stored in the storage areas corresponding to the access slots #0 to #14 with Z.

In FIG. 5, the AICH/alarm control section 4 outputs an alarm signal if it receives an AICH abnormality information after controlling the transmit power for the AICH. However, it may output an alarm signal for the first time when it receives the AICH abnormality information after outputting an AICH transmit power control signal multiple times, that is, receiving the AICH abnormality information multiple times.

The predetermined retransmitting interval and the step width of power ramping can be arbitrarily set. The determination criteria for difference between detection positions, Y chips and the determination criteria for the number of abnormal terminals, Z can be arbitrarily set.

As described above, if the mobile station 20 cannot receive an AICH in response to an RACH preamble it sent, it retransmits the RACH preamble after waiting for a predetermined retransmitting interval. However, the interval for retransmitting an RACH preamble may not be constant but random. If the retransmitting interval is random, the AICH abnormality determination section 3 compares, at steps S3 to S6 in FIG. 3, the detection position and the correlation power value for the RACH preamble currently detected with the detection position and the correlation power value for each of all the RACH preambles previously detected and stored in the storage section.

If the retransmitting interval is specified to be not only random but also at least larger than an interval corresponding to N access slots, it is not necessary to compare with the detection position and the correlation power value for each of all the RACH preambles previously detected. That is, if the storage section has storage areas which correspond to the past two frames, the current access slot is the access slot #14, and N=4, then the AICH abnormality determination section 3 only has to compare the detection position and the correlation power value for the RACH preamble currently detected with the detection position and the correlation power value for each of the RACH preambles stored in the storage areas corresponding to the access slots #0 to #10, respectively, and does not have to refer to the storage areas corresponding to the access slots #11 to #13, respectively.

Description will be now made on a second embodiment of the present invention, referring to drawings. Though the configuration of a radio base station apparatus according to the second embodiment of the present invention is the same as that shown in FIG. 2, the operation of the AICH/alarm control section 4 is different from that of the first embodiment of the present invention.

Figure 6:
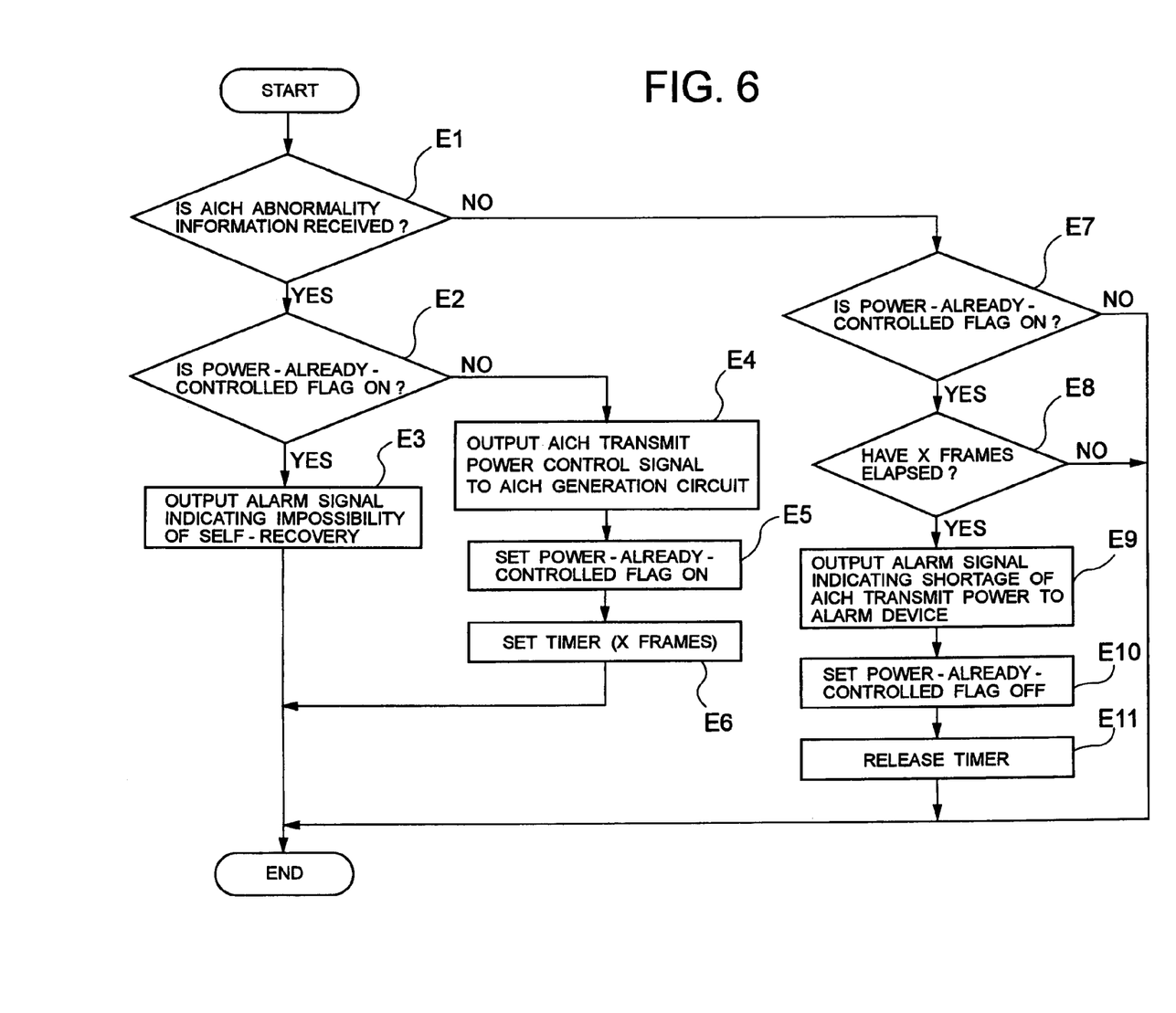
FIG. 6 is a flowchart showing the operation of the AICH/alarm control section according to a second embodiment of the present invention.

FIG. 6 shows the operation of the AICH/alarm control section 4 according to the second embodiment of the present invention. In FIG. 6, the AICH/alarm control section 4 is activated for each access slot. When AICH abnormality information from the AICH abnormality determination section 3 is inputted (step E1: YES), the AICH/alarm control section 4 checks the state of a power-already-controlled flag which indicates whether the transmit power for the AICH has been already controlled or not (step E2).

If the power-already-controlled flag is on, that is, if AICH abnormality information has been inputted once during the past X frames, and an AICH transmit power control signal has been outputted to the AICH generation circuit 5 (step E2: YES), then the AICH abnormality state cannot be solved within a predetermined period of time (X frames) even by increasing the AICH transmit power, and the possibility is high that the AICH abnormal state has been caused by a serious mistake in setting for the AICH transmit power or by an apparatus failure. Therefore, the AICH/alarm control section 4 outputs an alarm signal indicating impossibility of self-recovery to the alarm device 6 (step E3).

If the power-already-controlled flag is off, that is, if the AICH abnormality information is inputted for the first time, or an AICH abnormal state has been recovered before by increasing AICH transmit power (step E2: NO), then the AICH/alarm control section 4 outputs an AICH transmit power control signal to the AICH generation circuit 5 to increase the AICH transmit power, and thereby attempts recovery from the AICH abnormal state (step E4). The AICH/alarm control section 4 then sets the power-already-controlled flag on (step E5) and sets a timer (X frames) (step E6).

On the contrary, if no AICH abnormality information is inputted at the current access slot (step E1: NO). the power-already-controlled flag is on (step E7: YES), and the X frames have elapsed since the timer was set (step E8: YES), it is conceivable that the AICH abnormal state has been recovered by increasing the AICH transmit power. Therefore, the AICH/alarm control section 4 outputs an alarm signal indicating that the preset transmit power value for the AICH is too low, to the alarm device 6 (step E9), sets the power-already-controlled flag off (step E1) and releases the timer (step E11).

When no AICH abnormality information is inputted at the current access slot (step E1: NO), and if the power-already-controlled flag is off (step E7: NO) or if X frames have not elapsed since the timer was set (step E8: NO), then the operation ends.

According to the second embodiment of the present invention, if the AICH abnormal state is recovered within a predetermine period of time after increasing the AICH transmit power, the AICH/alarm control section 4 outputs an alarm signal indicating that the transmit power value preset for the AICH is too low, to the alarm device 6, and thereby the maintenance personnel can be notified that the abnormal state has been caused not by an apparatus failure but by the transmit power value preset for the AICH being too low.

Furthermore, since the power-already-controlled flag is set off at step E10, the AICH/alarm control section 4 can attempt recovery from the AICH abnormal state if the AICH abnormality information is again inputted because of the deterioration of the propagation environment. Furthermore, if the AICH abnormal state cannot be recovered within a predetermined period of time even by increasing the AICH transmit power higher, the AICH/alarm control section 4 outputs an alarm signal indicating impossibility of self-recovery to the alarm device 6. Thereby, the maintenance personnel can be notified that the abnormal state has been caused by a serious mistake in setting of the AICH transmit power value or by an apparatus failure.

The processing operation performed in accordance with each of the flowcharts shown in FIGS. 3 to 6 can be realized by causing a computer including a CPU (control section) to read and execute a program prestored in a storage medium such as a ROM.

The effect of the present invention is to enable self-recovery from an AICH abnormal state or notification to maintenance personnel. The reason that this is enabled is: in a mobile communication system in which a mobile station transmits an RACH preamble to a base station prior to transmitting an RACH message, and the base station, when detecting the RACH preamble from the mobile station, transmits an AICH to the mobile station, there is provided determination means for determining whether receiving of the AICH by the mobile station is enabled or disabled, based on detection information on the RACH preamble detected by the base station.

What is claimed is:

1. A radio base station apparatus in a mobile communication system wherein a mobile station repeatedly transmits a predetermined preamble to the radio base station apparatus prior to transmitting a message to the radio base station apparatus until the mobile station receives an indication signal indicating that transmitting of the message is permitted or refused, said radio base station apparatus comprising:

a transmitter such that the radio base station apparatus transmits the indication signal to the mobile station;

detection means for detecting the preamble; and determination means for determining whether a receiving of the indication signal by the mobile station is enabled or disabled, said determination being based on detection information on the detected preamble, wherein the radio base station apparatus transmits the indication signal to the mobile station when the radio base station apparatus detects the preamble from the mobile station.

2. The radio base station apparatus according to claim 1, wherein;

the message comprises an RACH (random access channel) message, the preamble comprises an RACH preamble, and the indication signal comprises an AICH (acquisition indicator channel).

3. The radio base station apparatus according to claim 1, wherein the detection information on the preamble detected by the radio base station apparatus includes at least one of a detection position and a reception power for the preamble.

4. The radio base station apparatus according to claim 1, wherein the determination means determines whether receiving of the indication signal by the mobile station is enabled or disabled by comparing the detection information on the detected preamble with detection information on a preamble detected previously.

5. The radio base station apparatus according to claim 1, wherein
the determination means outputs an abnormality signal if determining that receiving of the indication signal is disabled,
the radio base station apparatus further comprising control means for causing transmit power for the indication signal to be increased in response to receiving the abnormality signal.

6. The radio base station apparatus according to claim 5, wherein the control means outputs an alarm signal if receiving the abnormality signal again from the determination means after causing the transmit power for the indication signal to be increased.

7. The radio base station apparatus according to claim 6, wherein the control means causes the transmit power for the indication signal to be increased without outputting the alarm signal if receiving the abnormality signal again from the determination means after an elapse of a predetermined time after causing the transmit power for the indication signal in be increased.

8. The radio base station apparatus according to claim 5, wherein the determination means outputs the abnormality signal if a number of mobile stations for which receiving of the indication signal is determined to be disabled is equal to or above a predetermined threshold, or if the total of this number and the number of mobile stations for which receiving of the indication signal has been determined to be disabled previously is equal to or above the predetermined threshold.

9. An operation control method for a radio base station apparatus in a mobile communication system wherein a mobile station repeatedly transmits a predetermined preamble to a radio base station apparatus prior to transmitting a message to the radio base station apparatus until the mobile station receives an indication signal indicating that transmitting of the message is permitted or refused, said method comprising:
the radio base station detecting the preamble from the mobile station;
the radio base station apparatus transmitting the indication signal to the mobile station when the radio base station apparatus detects the preamble from the mobile station; and
the radio base station determining whether a receiving of the indication signal by the mobile station is enabled or disabled based on detection information on the detected preamble,
wherein a further action by the base station varies according to a result of the determining step, said further action comprising at least one of a control step of causing transmit power for the indication signal to be increased and a step of outputting an alarm signal.

10. The operation control method according to claim 9, wherein:
the message comprises an RACH (random access channel) message,
the preamble comprises an RACH preamble, and
the indication signal comprises an AICH (acquisition indicator channel).

11. The operation control method according to claim 9, wherein the detection information on the preamble detected by the radio base station apparatus includes at least one of a detection position and a reception power for the preamble.

12. The operation control method according to claim 9, wherein the determination step determines whether receiving of the indication signal by the mobile station is enabled or disabled by comparing the detection information on the detected preamble with detection information on a preamble detected previously.

13. The operation control method according to claim 9, further comprising a control step of causing transmit power for the indication signal to be increased if it is determined at the determination step that receiving of the indication signal is disabled.

14. The operation control method according to claim 13, further comprising a step of outputting an alarm signal if it is determined at the determination step again that receiving of the indication signal is disabled after the transmit power for the indication signal is increased at the control step.

15. The operation control method according to claim 14, wherein the alarm signal is not outputted but the transmit power for the indication signal is caused to be increased if receiving of the indication signal is again determined to be disabled at the determination step after the elapse of a predetermined time after the transmit power for the indication signal is increased at the control step.

16. The operation control method according to claim 13, wherein the control step causes the transmit power far the indication signal to be increased if a number of mobile stations for which receiving of the indication signal is determined to be disabled at the determination step is equal to or above a predetermined threshold, or if a total of this number and the number of mobile stations for which receiving of the indication signal has been determined to be disabled previously is equal to or above the predetermined threshold.

17. A machine-readable recording medium on which is recorded a program for causing a computer to perform an operation control method for a radio base station apparatus in a mobile communication system wherein a mobile station repeatedly transmits a predetermined preamble to a radio base station apparatus prior to transmitting a message to the radio base station apparatus until the mobile station receives an indication signal indicating that transmitting of the message is permitted or refused, said method comprising:
transmitting the indication signal to the mobile station when the radio base station apparatus detects the preamble from the mobile station;
determining whether a receiving of the indication signal by the mobile station is enabled or disabled based on detection information on the detected preamble; and
controlling a further action by the base station according to a result of the determining step, said further action comprising at least one of a control step of causing transmit power for the indication signal to be increased and a step of outputting an alarm signal.

18. The machine-readable recording medium on which is recorded a program according to claim 17, wherein:
the message comprises an RACH (random access channel) message,
the preamble comprises an RACH preamble, and
the indication signal comprises an AICH (acquisition indicator channel).

* * * * *